United States Patent
Saito et al.

(10) Patent No.: US 9,527,388 B2
(45) Date of Patent: Dec. 27, 2016

(54) REGENERATIVE CONTROL DEVICE AND REGENERATIVE CONTROL METHOD AND HYBRID MOTOR VEHICLE

(75) Inventors: Masakazu Saito, Shizuoka (JP); Yoshiki Ito, Shizuoka (JP); Masaaki Tagawa, Shizuoka (JP); Hitoshi Ohkuma, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 249 days.

(21) Appl. No.: 13/980,698

(22) PCT Filed: Jan. 31, 2011

(86) PCT No.: PCT/JP2011/000532
§ 371 (c)(1),
(2), (4) Date: Jul. 19, 2013

(87) PCT Pub. No.: WO2012/104903
PCT Pub. Date: Aug. 9, 2012

(65) Prior Publication Data
US 2013/0297134 A1    Nov. 7, 2013

(51) Int. Cl.
*B60W 10/18* (2012.01)
*B60W 10/184* (2012.01)
(Continued)

(52) U.S. Cl.
CPC .............. *B60L 7/18* (2013.01); *B60K 6/445* (2013.01); *B60L 7/14* (2013.01); *B60L 7/26* (2013.01);
(Continued)

(58) Field of Classification Search
None
See application file for complete search history.

(56) References Cited

U.S. PATENT DOCUMENTS 5,856,709 A * 1/1999 Ibaraki et al. .................. 290/45
6,013,992 A   1/2000 Ishikawa et al.
(Continued)

FOREIGN PATENT DOCUMENTS

DE   10 2005 030 223 A1   1/2007
JP        64-77401 A      3/1989
(Continued)

OTHER PUBLICATIONS

Notice of Allowance mailed Jan. 6, 2015 in corresponding Japanese Patent Application No. 2012-555555 (1 page).
(Continued)

*Primary Examiner* — Jerrah Edwards
*Assistant Examiner* — Demetra Smith-Stewart
(74) *Attorney, Agent, or Firm* — Rothwell, Figg, Ernst & Manbeck, P.C.

(57) ABSTRACT

A regenerative control capable of realizing a comfortable operation, along with an efficient collection of a regenerative energy of a motor generator and an effective regenerative braking control. A regenerative control device for a motor generator generates a regenerative braking power for decelerating a motor vehicle at a time of collecting regenerative energy generated by driving of the motor vehicle. The arrangement includes a driving state detection unit for detecting a driving state and a deceleration level acquisition unit for acquiring a deceleration level. A braking force setting unit sets the regenerative braking force of the motor generator at a time of detection of a deceleration operation by the driving state detection unit. A braking force adjustment unit adjusts and suppresses the regenerative braking force set by the braking force setting unit, according to acquired deceleration level.

4 Claims, 9 Drawing Sheets

(51) Int. Cl.
*B60L 7/18* (2006.01)
*B60W 10/08* (2006.01)
*B60W 20/00* (2016.01)
*B60W 30/18* (2012.01)
*B60K 6/445* (2007.10)
*B60L 7/14* (2006.01)
*B60L 7/26* (2006.01)
*B60L 11/12* (2006.01)
*B60L 11/14* (2006.01)
*B60L 11/18* (2006.01)
*B60L 15/20* (2006.01)

(52) U.S. Cl.
CPC ............ *B60L 11/123* (2013.01); *B60L 11/14* (2013.01); *B60L 11/1861* (2013.01); *B60L 15/2009* (2013.01); *B60W 10/08* (2013.01); *B60W 10/184* (2013.01); *B60W 20/00* (2013.01); *B60W 30/18127* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60W 2520/105* (2013.01); *Y02T 10/6217* (2013.01); *Y02T 10/6239* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/947* (2013.01)

(56) References Cited

U.S. PATENT DOCUMENTS

| | | | | |
|---|---|---|---|---|
| 6,033,041 | A * | 3/2000 | Koga et al. | 303/152 |
| 7,672,770 | B2 * | 3/2010 | Inoue | B60L 15/2072 701/70 |
| 8,738,260 | B2 * | 5/2014 | Miyazaki | B60T 1/10 180/65.265 |
| 2002/0041167 | A1 * | 4/2002 | Kitano et al. | 318/3 |
| 2003/0236624 | A1 * | 12/2003 | Kimura | G08G 1/163 701/301 |
| 2006/0196711 | A1 | 9/2006 | Endo | |
| 2006/0289210 | A1 * | 12/2006 | Yoshimi | 180/65.2 |
| 2007/0173372 | A1 * | 7/2007 | Ueno | 477/3 |
| 2007/0216222 | A1 * | 9/2007 | Miyazaki | B60T 17/22 303/155 |
| 2007/0228821 | A1 * | 10/2007 | Maki | B60K 6/445 303/151 |
| 2008/0243346 | A1 * | 10/2008 | Huseman | 701/53 |
| 2009/0107742 | A1 * | 4/2009 | Schulz et al. | 180/65.7 |
| 2009/0115244 | A1 | 5/2009 | Schluter | |
| 2009/0120699 | A1 * | 5/2009 | Suzuki et al. | 180/65.265 |
| 2009/0242288 | A1 * | 10/2009 | Oyobe et al. | 180/65.265 |
| 2010/0066164 | A1 * | 3/2010 | Kokubo | B60T 8/36 303/191 |
| 2010/0116571 | A1 * | 5/2010 | Suzuki | 180/65.25 |
| 2011/0144847 | A1 * | 6/2011 | Niwa | B60L 7/18 701/22 |
| 2011/0144877 | A1 * | 6/2011 | Niwa | B60L 7/18 701/70 |
| 2011/0320067 | A1 * | 12/2011 | Ishikawa | B60T 1/10 701/2 |

FOREIGN PATENT DOCUMENTS

| | | |
|---|---|---|
| JP | 1-58203 U | 4/1989 |
| JP | 8-149606 A | 6/1996 |
| JP | 11-220811 A | 8/1999 |
| JP | 11-285102 A | 10/1999 |
| JP | 2002-281607 A | 9/2002 |
| JP | 2006-25495 A | 1/2006 |
| JP | 2008-12992 A | 1/2008 |

OTHER PUBLICATIONS

Office Action mailed Apr. 20, 2015 in corresponding Chinese Patent Application No. 201180065277.7 (with an English translation) (18 pages).

International Search Report mailed Apr. 5, 2011 in PCT/JP2011/000532.

Office Action mailed Aug. 4, 2014 in corresponding German Patent Application No. 11 2011 104 811.4 (with an English translation) (10 pages).

* cited by examiner

REGENERATIVE CONTROL DEVICE AND REGENERATIVE CONTROL METHOD AND HYBRID MOTOR VEHICLE

CROSS REFERENCE TO RELATED APPLICATION

This application is a 35 U.S.C. 371 National Phase Entry Application from PCT/JP2011/000532, filed Jan. 31, 2011, the disclosure of which is incorporated herein in its entirety by reference.

TECHNICAL FIELD

The present invention relates to a regenerative control device and a regenerative control method and a hybrid motor vehicle, and more specifically, to one that can generate a braking force according to an operation intention in a case of using a regenerative braking force along with a hydraulic braking force.

BACKGROUND TECHNIQUE

The motor generator functions as an electric motor by being coupled to a driving shaft, while it is capable of collecting a generated electric energy as a regenerative energy by charging it into a battery (an electrical storage device), by functioning as an electrical generator as a rotational shaft rotates in conjunction with that driving shaft.

This regenerative energy is collected as an electric energy that generates electricity by rotating a rotational shaft of a motor generator, so that a load for rotating that rotational shaft can be utilized as a regenerative braking force, and it has been utilized by mounting a regenerative control device on various devices that mount that motor generator as a power source by making it function as an electric motor.

For this motor generator, not only a case of being mounted on a device singly, but also a case of being mounted on a hybrid motor vehicle which uses it as a power source by making it function as a motor generator, along with an internal combustion engine, the so called engine (hereafter also referred to simply as an engine), that utilizes the combustion energy of gasoline and the like. In this hybrid motor vehicle, the driving speed is decelerated by using a degenerative braking force due to making that motor generator function as an electrical generator by the regenerative control device, along with a hydraulic braking force according to a friction force generated by a hydraulic control device (for example, Patent Document 1).

Note that the motor generator has an output characteristic that generates the maximum torque in a low speed driving region where the number of revolutions is small, in the case of functioning as an electric motor, and it has a relatively small torque in a high speed driving region where the number of revolutions is large. Also, it is similar for the regenerative braking force, and as shown in FIG. 10, the regenerative braking force is set to be zero at a speed by which the motor vehicle can be stopped quickly, for example, a speed range at a level of driving by the so called creep phenomenon.

PRIOR ART DOCUMENT

Patent Document

Patent Document 1: Japanese Patent Application publication No. 2002-281607

SUMMARY OF THE INVENTION

Problems to be Solved by the Invention

In such a regenerative control device, at a time of deceleration in the case of mounting a motor generator on a moving device such as a motor vehicle, it is ideal to collect the electric energy efficiently by making that motor generator function as an electrical generator, while making the regenerative braking force to work effectively. On the other hand, for that generative control device, there is a need to realize the braking control that makes an operation feeling such as a riding comfort on a moving device comfortable.

For this reason, the present invention has an object to provide a regenerative control that can realize a comfortable operation along with an efficient collection of a regenerative energy of a motor generator and an effective regenerative braking control.

Means for Solving Problems

One form of the invention of the regenerative control device that solves the above noted problems is a regenerative control device for a motor generator that generates a regenerative braking power for decelerating a motor vehicle at a time of collecting a regenerative energy generated by driving of the motor vehicle, one that is characterized by having: a driving state detection unit for detecting a driving state of said motor vehicle; a deceleration level acquisition unit for acquiring a deceleration level of said motor vehicle from a detection information of the driving state detection unit; a braking force setting unit for setting said regenerative braking force of said motor generator at a time of detection of a deceleration operation of said motor vehicle by said driving state detection unit; and a braking force adjustment unit for adjusting and suppressing said regenerative braking force set by said braking force setting unit, according to said deceleration level acquired by said deceleration level acquisition unit.

One form of the invention of the regenerative control method that solves the above noted problems is a regenerative control method for a motor generator that generates a regenerative braking power for decelerating a motor vehicle at a time of collecting a regenerative energy generated by driving of the motor vehicle, one that is characterized in that, when a deceleration operation of said motor vehicle is detected, said regenerative braking force of said motor generator to be set is adjusted and suppressed according to a deceleration level of said motor vehicle.

As forms of the present invention, in addition to using the above noted problem solving means as a basic configuration, it may have the following configurations.

As a first another form of the invention of the regenerative control device that solves the above noted problems, said braking force setting unit may set said regenerative braking force of said motor generator to be constant after the detection of said deceleration operation of said motor vehicle by said driving state detection unit; and said braking force adjustment unit may make a suppression of said regenerative braking force of said motor generator small or cancel the suppression in a case where said deceleration level acquired by said deceleration level acquisition unit is large, and may make the suppression of said regenerative braking force of said motor generator large in a case where the deceleration level is small.

As a first another form of the invention of the regenerative control method that solves the above noted problems, said regenerative braking force of said motor generator may make said suppression small or cancel said suppression in a case where said deceleration level is large, and may make said suppression large in a case where said deceleration level is small.

As a second another form of the invention of the regenerative control device that solves the above noted problems, said braking force adjustment unit may correct said regenerative braking force in a direction of suppressing, by multiplying said regenerative braking force of said motor generator with a preset correction factor.

As a second another form of the invention of the regenerative control method that solves the above noted problems, said regenerative braking force of said motor generator may be corrected in a direction of suppressing, by multiplying a preset correction factor.

As a third another form of the invention of the regenerative control device that solves the above noted problems, said correction factor may be set to be decreased according to a size of said deceleration level acquired by said deceleration level acquisition unit.

As a third another form of the invention of the regenerative control method that solves the above noted problems, said correction factor may be set to be decreased according to a size of said deceleration level.

As a fourth another form of the invention of the regenerative control device that solves the above noted problems, said correction factor may have a value for which there is no suppression, for a size of said deceleration level acquired by said deceleration level acquisition unit that is greater than or equal to a preset first setting value.

As a fourth another form of the invention of the regenerative control method that solves the above noted problems, said correction factor may have a value for which there is no suppression, for a size of said deceleration level that is greater than or equal to a preset first setting value.

As a fifth another form of the invention of the regenerative control device that solves the above noted problems, said braking force adjustment unit may revise a corrected value of said regenerative braking force in a direction of further suppressing, by multiplying a preset revision factor, in a case where the deceleration level acquired by said deceleration level acquisition unit is smaller than a preset second setting value.

As a fifth another form of the invention of the regenerative control method that solves the above noted problems, said regenerative braking force of said motor generator may be revised in a direction of further suppressing a corrected value by said correction factor, by multiplying a preset revision factor, in a case where the deceleration level is smaller than a preset second setting value.

As a sixth another form of the invention of the regenerative control device that solves the above noted problems, said revision factor may be set to be decreased according to a motor vehicle speed detected by said driving state detection unit.

As a sixth another form of the invention of the regenerative control method that solves the above noted problems, said revision factor may be set to be decreased according to a driving speed of said motor vehicle.

As a seventh another form of the invention of the regenerative control device that solves the above noted problems, said braking force adjustment unit may suppress said regenerating braking force in a smoothly continuous manner until said regenerative braking force of said motor generator is released as a motor vehicle speed detected by said driving state detection unit reaches a speed immediately before a stopping.

As a seventh another form of the invention of the regenerative control method that solves the above noted problems, said regenerating braking force of said motor generator may be suppressed in a smoothly continuous manner until it is released as a driving speed of said motor vehicle reaches a speed immediately before a stopping.

As an eighth another form of the invention of the regenerative control device that solves the above noted problems, the above noted regenerative control device may be mounted on a hybrid motor vehicle, along with a hydraulic braking device for generating a braking force of said motor vehicle according to a stepping force on a brake pedal. For example, the above noted regenerative control device may be mounted, along with said hydraulic braking device, on a motor vehicle that has an internal combustion engine for rotating a rotational shaft by a combustion energy, first and second motor generators for rotating the rotational shaft by an electric energy, a driving shaft for transmitting a driving force that drives the motor vehicle, and a planetary gear mechanism for coupling said rotational shaft for respective one of said first and second motor generators, said rotational shaft of said internal combustion engine and said driving shaft, wherein said first and second motor generators serve either one or both of a function for rotating said rotational shaft by generating the driving power that drives said motor vehicle, and a function for collecting the regenerative energy at a time of driving said motor vehicle.

Effects of the Invention

As such, according to one form of the present invention, when the motor vehicle decelerates, it is possible to decelerate the motor vehicle by the regenerative braking force that is suppressed according to the deceleration level, by preventing the maximum regenerative braking force to be set from being applied to the motor vehicle unchanged, by suppressing it according to the deceleration level. For this reason, it is possible to prevent the motor vehicle from being decelerated continuously by the maximum regenerative braking force that is set at a time of the deceleration operation, while it is also possible to efficiently collect the regenerative energy that is generated by the motor generator according to the appropriate regenerative braking force. Consequently, it is possible to make the motor generator to generate the effective regenerative braking force, while it is also possible to collect the regenerative energy efficiently at that motor generator, and at the same time, it is possible to stop the motor vehicle by comfortably braking it and preventing the regenerative braking force from being applied excessively.

EMBODIMENTS FOR IMPLEMENTING THE INVENTION

In the following, with reference to the drawings, the embodiments of the present invention will be described in detail. FIG. 1 to FIG. 10 are figures showing one embodiment of a hybrid motor vehicle that mounts a regenerative control device according to the present invention.

Figure 1:
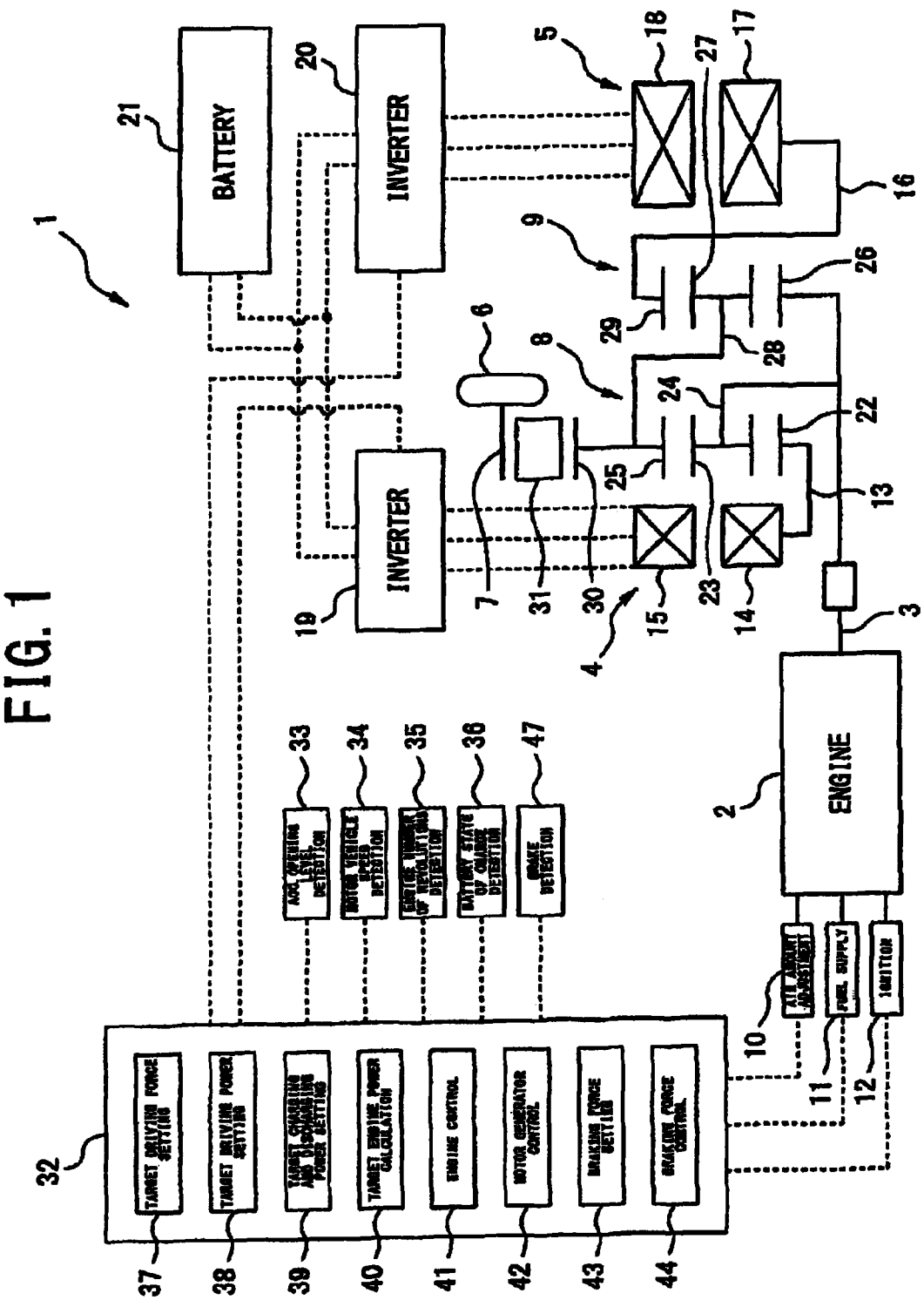
FIG. 1 is a diagram showing one embodiment of a hybrid motor vehicle that mounts a regenerative control device according to the present invention, which is a block diagram showing its entire configuration.

In FIG. 1, a hybrid motor vehicle mounts a driving control device 1 and moves by rolling driving wheels 6 and the like by carrying out various driving controls including the activation of an internal combustion engine (engine) 2 at a time of moving backward. First of all, the hybrid motor vehicle has, as driving systems, an engine 2 for generating a driving force that rotationally drives an output shaft 3 by combustion of fuel, first and second motor generators 4 and 5 for generating the driving force that rotationally drives rotational shafts 13 and 16 by electric energies as electric motors and generating electric energies by rotations of their rotors 14 and 17 by being activated as an electrical generator, the rotational shafts (not shown in the figure) that integrally rotate with the output shaft 3 of the engine 2 and the rotors 14 and 17 of the first and second motor generators 4 and 5, and first and second planetary gear mechanisms 8 and 9 respectively coupled with a driving shaft 7 connected to the driving wheels 6 of the hybrid motor vehicle, wherein the driving control device 1 controls the driving of these various driving systems.

The engine 2 has, as will be described below, an air amount adjustment unit 10 such as a throttle valve or the like for adjusting an amount of intake air in correspondence to an acceleration opening level (an amount of stepping on an acceleration pedal not shown in the figure), a fuel supply unit 11 of a fuel injection valve or the like for supplying fuel in correspondence to the amount of intake air, and an ignition unit 12 of an ignition device or the like to ignite the fuel. The driving control device 1 controls the air amount adjustment unit 10, the fuel supply unit 11 and the ignition unit 12 of the engine 2, and generates the driving force by the combustion of the fuel by adjusting the combustion state of the fuel.

The first and second motor generators 4 and 5 are configured such that the rotational shafts 13 and 16 and the rotors 14 and 17 that are externally equipped with stators 15 and 18 respectively fixed to housing sides will be integrally rotated in their interior, wherein the stators 15 and 18 are connected to a battery (an electric storage device) 21 via first and second inverters 19 and 20. The driving control device 1 controls amounts of electricity supplied from the battery 21 to the stators 15 and 18 via the first and second inverters 19 and 20, and adjusts the driving force to be generated when the first and second motor generators 4 and 5 are activated as the electric motors. Also, this driving control device 1 adjusts the amount of electricity for charging the battery 21 by controlling a braking force to be generated at a time of activating the first and second motor generators 4 and 5 as the electrical generators as their rotational shafts 13 and 16 are rotated cooperatively.

The first and second planetary gear mechanisms 8 and 9 respectively have sun gears 22 and 26, planetary gears 23 and 27, and ring gears 25 and 29, where the sun gears 22 and 26 are engaged with the planetary gears 23 and 27 supported by the planetary carriers 24 and 28, and these planetary gears 23 and 27 are engaged with the ring gears 25 and 29, so that they are coupled to be capable of transmitting the driving force with each other.

The rotational shaft 13 of the first motor generator 4 is coupled to the sun gear 22 of the first planetary gear mechanism 8, and the rotational shaft 16 of the second motor generator 5 is coupled to the ring gear 29 of the second planetary gear mechanism 9. Also, the planetary carrier 24 of the first planetary gear system 8 and the sun gear 26 of the second planetary gear mechanism 9 are coupled together and commonly coupled to the output shaft 3 of the engine 2. The ring gear 25 of the first planetary gear mechanism 8 and the planetary carrier 28 of the second planetary gear mechanism 9 are coupled together and coupled to the output gear 30 for outputting the driving force to the driving shaft 7 via an output transmission mechanism 31 of gears, chains and the like. In this way, in the driving system of the hybrid motor vehicle, it is made possible to carry out exchanges of the driving force among the engine 2, the first and second motor generators 4 and 5, and the driving shaft 7.

Also, the first and second planetary gear mechanisms 8 and 9 have a rotational central axis of each rotational element arranged on an identical axis, and the first motor generator 4 is arranged between the first planetary gear mechanism 8 and the engine 2, while the second motor generator 5 is arranged on a side facing away from the engine 2 of the second planetary gear mechanism 9. This second motor generator 5 is equipped with a capability for driving the hybrid motor vehicle by a single output alone.

Then, the driving control device 1 is made to control the driving state of the motor vehicle and the like while detecting and collecting various information, by connecting the air amount adjustment unit 10, the fuel supply unit 11 and the ignition unit 12 that control the driving of the engine 2, as well as the inverters 19 and 20 that are connected to the stators 15 and 18 so as to control the driving of the first and second motor generators, to a driving control unit 32. Here, although the detailed description will be omitted, the driving control unit 32 is formed by a central processing unit, a memory and the like, and executes various processings to be described below by carrying out computational processings and the like while temporarily storing detected and acquired information according to programs and setting values that are stored in advance.

The driving control unit 32 has an acceleration opening level detection unit 33 for detecting an acceleration opening level tvo that is an amount of stepping on an acceleration pedal, a motor vehicle speed detection unit 34 for detecting a motor vehicle speed (vehicle speed) Vs of the hybrid motor vehicle, an engine number of revolutions detection unit 35 for detecting the engine number of revolutions Ne of the engine 2, and a battery state of charge detection unit (an stored charge amount detection unit) 36 for detecting a remaining charge amount SOC (a state of charge) of the battery 21. This driving control unit 32 is made to be functioning as a target driving force setting unity 37, a target driving power setting unit 38, a target charging and discharging power setting unit 39, a target engine power calculation unit 40, an engine control unit 41 and a motor generator control unit 42, based on these various detected and acquired information.

As the target driving power setting unit 37, it determines a target driving force Fdry for driving the hybrid motor vehicle according to the acceleration opening level tvo detected by the acceleration opening level detection unit 33 and a motor vehicle speed Vs detected by the motor vehicle speed detection unit 34, by retrieving with a retrieval map not shown in the figure which uses the motor vehicle speed Vs as a parameter with the acceleration opening level tvo as a reference.

As the target driving power setting unit 38, it sets a target driving power Pdry according to the acceleration opening level tvo detected by the acceleration opening level detection unit 33 and a motor vehicle speed Vs detected by the motor vehicle speed detection unit 34. Here, the target driving power Pdry is set by multiplying the target driving force Fdry and the motor vehicle speed Vs.

As the target charging and discharging power setting unit 39, a target charging and discharging power Pbat is set according to at least the state of charge SOC of the battery 21 detected by the battery state of charge detection unit 36. Here, the target charging and discharging power Pbat is set according to the battery state of charge SOC and the motor vehicle speed Vs, by retrieving with a retrieval map not shown in the figure which uses the motor vehicle speed Vs as a parameter with the battery remaining charge amount SOC as a reference.

As the target engine power calculation unit 40, it calculates a target engine power Peg from the target driving power Pdry set by the target driving power setting unit 38 and the target charging and discharging power Pbat set by the target charging and discharging power setting unit 39. Here, the target engine power Peg is obtained by subtracting the target charging and discharging power Pbat from the target driving power Pdrv.

As the engine control unit 41, it controls a driving state of the air amount adjustment unit 10, the fuel supply unit 11 and the ignition unit 12, such that the engine 2 will operate at an operation point at which a running efficiency of the engine 2 that is determined according to the target engine power Peg is good (that is determined by retrieving with an engine operation point retrieval map not shown in the figure which uses the engine number of revolutions and the engine torque as parameters).

As the motor generator control unit 42, it controls a driving state of the first and second inverters 19 and 20 such that a total electric power of the first and second motor generators 4 and 5 becomes the target charging and discharging power Pbat.

With this configuration, the driving control unit 32 determines the operation point (the engine number of revolutions and the engine torque) at which the running efficiency of the engine 2 based on the target engine power Peg is good, and drives and controls the air amount adjustment unit 10, the fuel supply unit 11 and the ignition unit 12 by the engine control unit 41 such that the engine 2 will operate at this operation point. Also, the driving control unit 32 controls each torque of the engine 2 and the first and the second motor generators 4 and 5, by driving and controlling the inverters 19 and 20 by the motor generator control unit 42 such that a total electric power of the first and second motor generators 4 and 5 becomes the target charging and discharging power Pbat. At this point, the driving power generated by the engine 2 and the first and second motor generators 4 and 5 is transmitted to the driving wheels 6 from the driving shaft 7 via the first and second planetary gear mechanisms 8 and 9 so that the hybrid motor vehicle will be running.

Now, the hybrid motor vehicle of the present embodiment is mounting the so called in-line system in which a brake pedal and a hydraulic brake device are connected. In this in-line system, the braking is applied to the running motor vehicle by a friction force (hydraulic braking force) generated by contacting and pressing a brake pad onto a brake disk and the like via a wheel cylinder, using the hydraulic pressure that increases a pressure by a master cylinder according to an amount of stepping (a stepping force) on the brake pedal operated by a driver. Note that, for the hydraulic braking, there is a brake-by-wire system (for example, Japanese Patent Application Publication No. H11-285102) besides the in-line system, which generates the pressure braking force via a wheel cylinder by detecting an amount of stepping on the brake pedal by a stroke sensor and the like and driving a hydraulic regeneration device and the like based on that detection information. In other words, in the brake-by-wire system, the brake pedal and the hydraulic brake device are not connected, so that it can be configured to carry out a braking control of a running motor vehicle based on an intention of a driver, but it is difficult to adopt because it would require a high cost.

Also, in this hybrid motor vehicle, it is made such that the braking is applied to a running motor vehicle by utilizing (adding) a regenerative braking force at a time of collecting the regenerative energy by making the first and second motor generators 4 and 5 functioning as the electrical generators at a time of the deceleration and the like, along with the hydraulic braking force. On the other hand, in the hybrid motor vehicle, if the regenerative braking force is left functioning in an attempt to improve the fuel efficiency and the energy efficiency (the collection of the regenerative energy with a good efficiency), the regenerative braking force will remain effective even immediately before the stopping so that it would be stopped suddenly and that would aggravate the riding comfort, so that the regenerative braking force is made to be released immediately before the stopping. Namely, in the hybrid motor vehicle, there is a need to satisfy the conflicting desires for the collection of the energy and the riding comfort.

For this reason, the driving control unit 32 has a brake detection unit 47 for detecting that the brake pedal not shown in the figure is stepped (an operation requiring the deceleration), in addition to the acceleration opening level detection unit 33, the motor vehicle speed detection unit 34, the engine number of revolutions detection unit 35 and the battery state of charge detection unit 36. and this driving control unit 32 is also made to function as a braking force setting unit 43 and a braking force control unit 44 based on these various detected and acquired information. Note that, in the present embodiment, the operation of the brake pedal is utilized as the deceleration requiring operation, but it may also be possible to judge (detect) and utilize a releasing of the acceleration pedal as the deceleration requiring operation.

Figure 2:
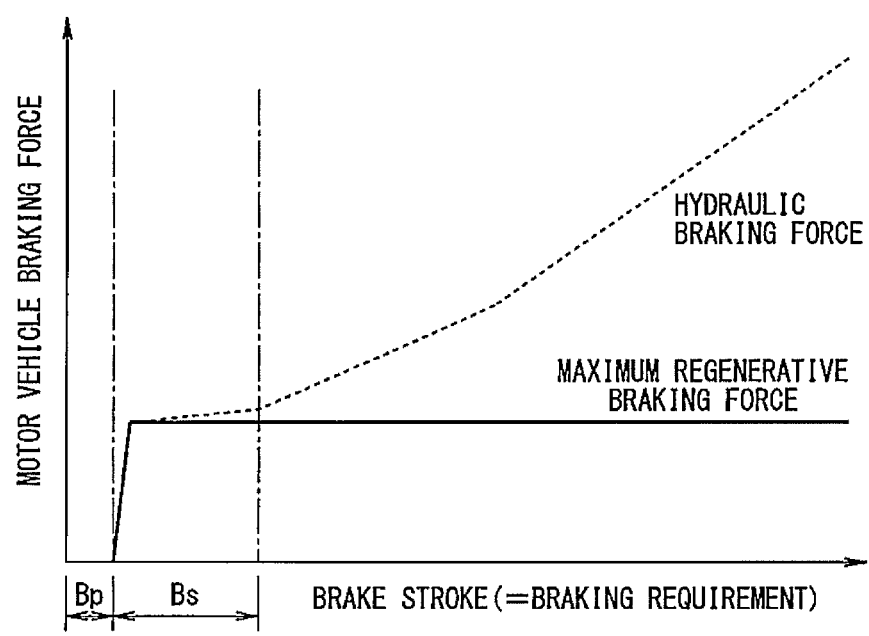
FIG. 2 is a graph for explaining its setting of a regenerative braking force with respect to a hydraulic braking force.
Figure 10:
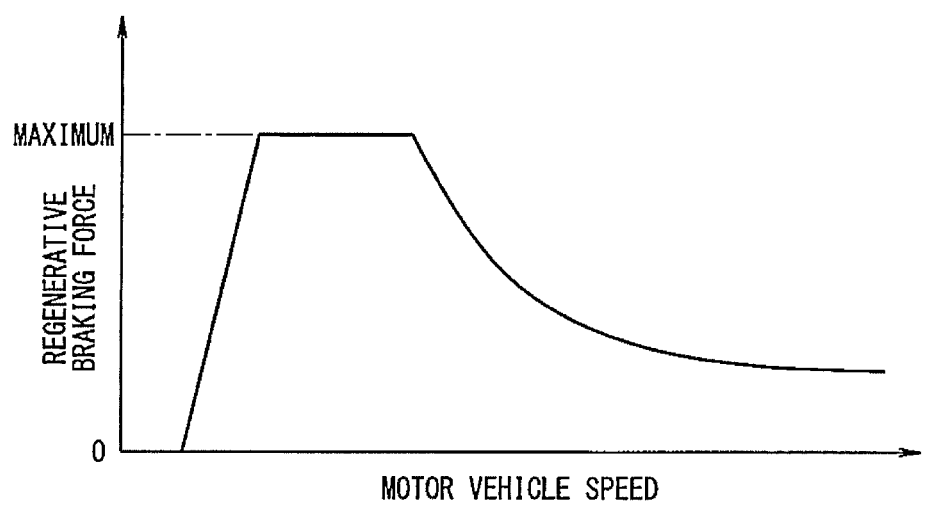
FIG. 10 is a graph for showing a relationship between a regenerative braking force and a driving speed.

As the braking force setting unit 43, as shown in FIG. 2, it is made such that, when the brake detection unit 47 detects a brake stroke of an amount of stepping Bs that exceeds a stepping margin Bp of the brake pedal, the regenerative braking force (value) at a time of high speed driving shown in FIG. 10 itself or ideally a certain value that is a value greater than that is set as the maximum regenerative braking force. The braking force control unit 44 is made to control the driving of the motor generators 4 and 5 as the electrical generators based on the maximum regenerative braking force set by that braking force setting unit 43. Namely, the brake detection unit 47 constitutes the driving state detection unit along with the motor vehicle speed detection unit 34. Note that, in order to carry out the regenerative control that collects the electric energy even in the case of the so called coast driving (coasting) which decelerates without having the brake pedal stepped on as will be described below, this braking force setting unit 43 is made to set a constant coasting regenerative braking force suitable for it, and the braking force control unit 44 is also made to control the driving of the motor generators 4 and 5 as the electrical generators based on the coasting regenerative braking force set by that braking force setting unit 43. Also, as the maximum regenerative braking force noted above, it may be made to set the regenerative braking force that becomes optimal according to the motor vehicle speed Vs detected by the motor vehicle speed detection unit 34.

When the brake detection unit 47 detects that the driver has stepped on the brake pedal, the braking force control unit 44 is made to carry out the regenerative braking by resetting (adjusting) and suppressing the maximum regenerative braking force set by the braking force setting unit 43, based on the motor vehicle speed Vs detected by the motor vehicle speed detection unit 34 and the deceleration level (the so called negative acceleration) that is an amount of change per unit time calculated from that motor vehicle speed Vs. Namely, the braking force control unit 44 also constitutes the deceleration level acquisition unit along with the motor vehicle speed detection unit 34, while it also constitutes the braking force adjustment unit. Note that this braking force control unit 44 is made to carry out the regenerative braking with the coasting regenerative braking force set by the braking force setting unit 43, in the case of detecting the deceleration of the motor vehicle (the motor vehicle driving state in which the amount of change per unit time of the motor vehicle speed Vs becomes the deceleration level), even when the brake detection unit 47 does not detect the stepping of the brake pedal by the driver, but the detailed description of this will be omitted. Note that it goes without saying that the acquisition of the deceleration level of the motor vehicle may be not just the calculation processing but also one that is directly acquired by a sensor.

Figure 3:
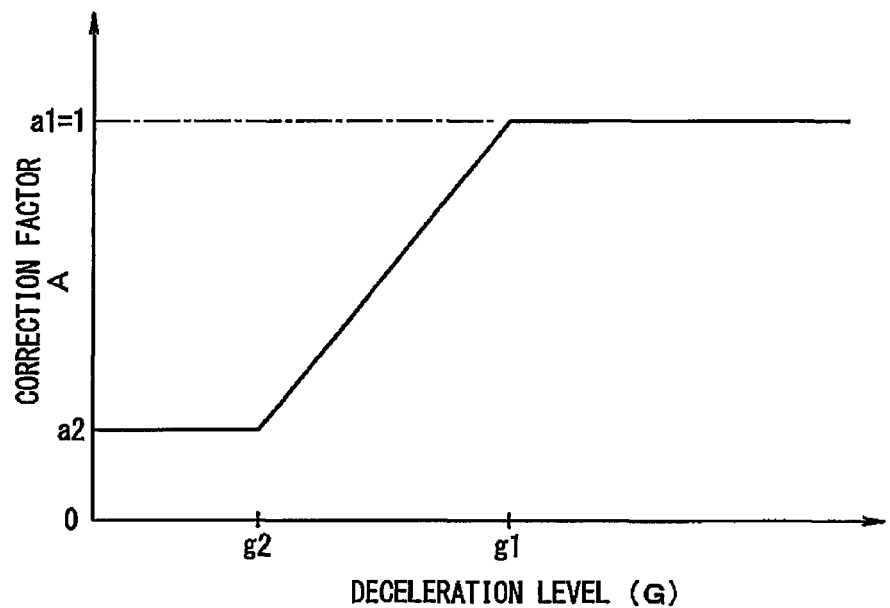
FIG. 3 is a graph for explaining its setting of a correction factor for correcting a regenerative braking force.

As the concrete maximum regenerative braking force suppressing control, the braking force control unit 44 retrieves a correction factor A according to the deceleration level of the motor vehicle from a correction factor A retrieval map (a graph of a correction factor according to the deceleration level of the motor vehicle) shown in FIG. 3 that is set in advance, and suppresses the regenerative braking force to be applied to the running motor vehicle by multiplying the correction factor with the maximum regenerative braking force set by the braking force setting unit 43 and replacing the maximum regenerative braking force with a corrected regenerative braking force. Also, this braking force control unit 44 retrieves a revision factor B according to the motor vehicle speed Vs from a revision factor B retrieval map (a graph of a revision factor according to the motor vehicle speed Vs) shown in FIG. 4 that is set in advance, and further suppresses the regenerative braking force to be applied to the running motor vehicle by multiplying the revision factor with the corrected regenerative braking force that is corrected by the correction factor A and replacing the corrected regenerative braking force with the revised regenerative braking force.

Figure 4:
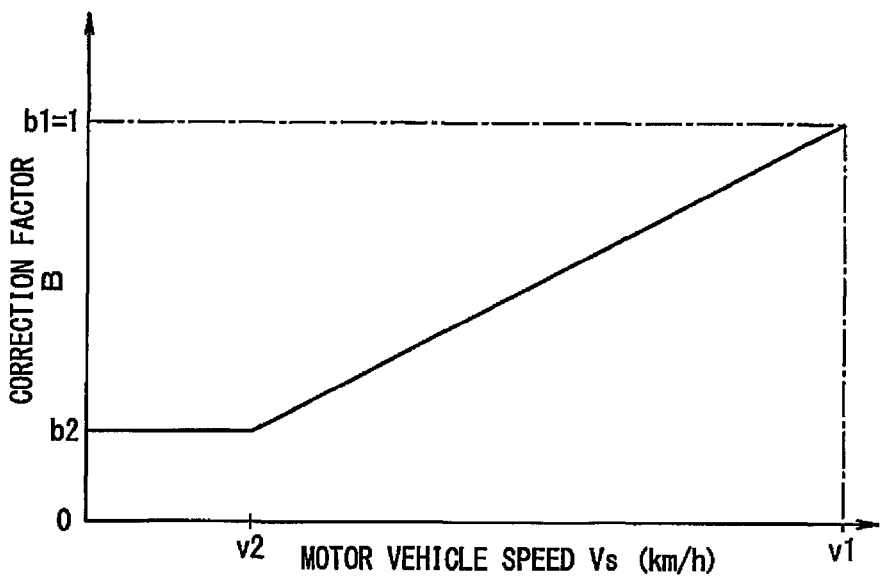
FIG. 4 is a graph for explaining its setting of a revision factor for revising a regenerative braking force after a correction.

Here, the correction factor A retrieval map is produced, for example, as shown in FIG. 3, on an assumption of distribution with a range of about 0.2 to 0.25 G as a center, for example, with the gravitational acceleration G as a reference, because in general the sudden braking (heavy braking) is in 0.8 to 1.0 G and the deceleration operation is normally carried out at about a half of that or less. More specifically, this correction factor A retrieval map is such that the correction factor a1=1 is set so that no correction will be made in the case of greater than or equal to 0.5 G (a first setting value), and a small correction factor a2 is set to be a constant value so that the regenerative braking force will not be released in this suppressing control in the case of less than or equal to 0.2 G. Between the deceleration level g1 of 0.5 G and the deceleration level g2 of 0.2 G, a correction factor a is set such that it gradually decreases linearly. Also, the revision factor B retrieval map is such that, for example, as shown in FIG. 4, a revision factor b1=1 is set so that no revision will be made in the case of exceeding the motor vehicle speed v1 (a second setting value) at a time of the high speed driving that is set in advance. The revision factor b for less than or equal to that motor vehicle speed v1 is such that a small revision factor b2 is set to be a constant value so that it is gradually decreased linearly to the motor vehicle speed v2 immediately before the stopping and the regenerative braking force will not be released in this suppressing control for less than or equal to that motor vehicle speed v2. In essence, the braking force control unit 44 does not suppress the maximum regenerative braking force set by the braking force setting unit 43 in the case where the deceleration level G or the motor vehicle speed Vs of the running motor vehicle that is decelerating is large, or it effectively utilizes the regenerative braking force by keeping the suppression to be small even in the case of suppressing. On the other hand, the braking force control unit 44 is made to utilize the regenerative braking force by largely suppressing the maximum regenerative braking force set by the braking force setting unit 43 as that deceleration level G becomes smaller such that it becomes smoothly continuous until it reaches to a speed immediately before that motor vehicle stops.

Figure 5:
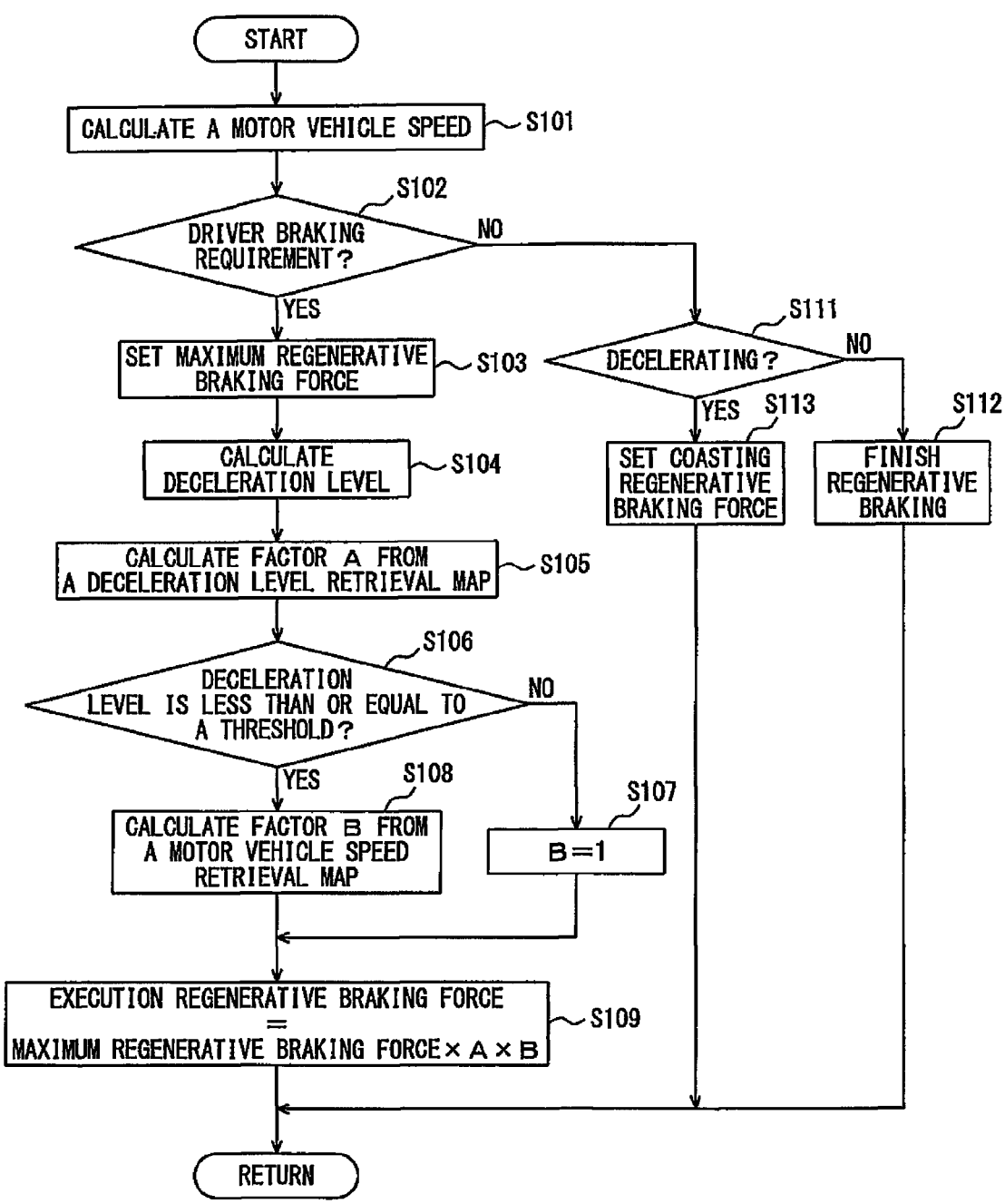
FIG. 5 is a flow chart for explaining its processing for correcting a regenerative braking force.

Then, the braking force control unit 44 is made to suppress the maximum regenerative braking force set by the braking force setting unit 43 by carrying out the calculation control processing (control method) to be explained with the flow chart shown in FIG. 5. In the following, this regenerative braking by suppressing the maximum regenerative braking force will be mainly described.

More specifically, as shown in FIG. 5, in the braking force control unit 44, at the step S101, the motor vehicle speed detection unit 34 acquires (detects) the motor vehicle speed Vs by the calculation processing from the rotational speeds of the motor generators 4 and 5 (which may be the rotational speed of the driving shaft 7, and may be either a measured value or an estimated value). Next, at the step S102, the braking force control unit 44 checks whether the driver is requiring the braking of the running motor vehicle or not, according to presence or absence of the receiving of the detection signal (information) by a switch and the like not shown in the figure of the brake detection unit 47. In the case where the braking requirement is confirmed at this step S102, it proceeds to the step S103, whereas in the case where the braking requirement is not confirmed, it proceeds to the step S111.

At the step S111 in the case where the braking requirement was not confirmed at the step S102, the braking force control unit 44 checks whether it is in the decelerating state or not, by calculating an amount of change per unit time of the motor vehicle speed Vs detected by the speed detection unit 34.

In the case where it is confirmed that the motor vehicle is not in the decelerating driving state at this step S111, it proceeds to the step S112. At this step S112, the braking force control unit 44 does not start the control of the regenerative braking or finishes the already started regenerative braking control, and then repeats the similar processing by returning to the step S101.

Also, in the case where it is confirmed that the motor vehicle is in the coast driving state (coasting state) which is the decelerating driving at the step S111, it proceeds to the step S113. At this step S113, the braking force setting unit 43 sets the coasting regenerative braking force suitable for the coasting, and the braking force control unit 44 starts and continues the driving control of the motor generators 4 and 5 such that this coasting regenerative braking force will be generated, while repeating the similar processing by returning to the step S101. At this step S111, the switch due to the brake pedal operation that is detected by the brake detection unit 47 is OFF, but in the case where the amount of change per unit time of the motor vehicle speed Vs that is detected by the speed detection unit 34 is the decelerating driving, it is judged as the coast driving state and the regenerative control for generating the coasting regenerative braking force is carried out. However, it may not be limited to this case and it may be made to make a judgment by also carrying out a check that the amount of stepping of the acceleration pedal that is detected by the acceleration opening level detection unit 33 is absent so that the acceleration opening level two is zero.

On the other hand, at the step S103 in the case where the braking requirement is confirmed at the step S102, the braking force setting unit 43 sets the maximum regenerative braking force that is already determined, and it proceeds to the step S104. At this step S104, the braking force control unit 44 calculates and acquires the deceleration level G by calculating the amount of change per unit time of the motor vehicle speed Vs detected by the speed detection unit 34, and it proceeds to the step S105. At this step S105, the braking force control unit 44 retrieves (calculates) and acquires the correction factor A according to the acquired deceleration level G from the retrieval map shown in FIG. 3, and it proceeds to the step S106. At this step S106, whether this deceleration level G is less than or equal to a threshold or not is checked, with a small deceleration level G for which a small hydraulic braking force is necessary, for example 0.2 G (a first setting value) as a threshold. In the case where it is confirmed that the deceleration level G is not less than or equal to that threshold at this step S106, it proceeds to the step S107, whereas in the case where it is confirmed that the deceleration level G is less than or equal to the threshold, it proceeds to the step S108.

At the step S107 in the case where it is confirmed that the deceleration level G is not less than or equal to the threshold at the step S106, the braking force control unit 44 sets B=1 as the revision factor B, and it proceeds to the step S109, whereas at the step S108 in the case where it is confirmed that this deceleration level G is less than or equal to the threshold, the braking force control unit 44 retrieves (calculates) and acquires the revision factor B according to the acquired driving speed Vs of the motor vehicle from the retrieval map shown in FIG. 4, and it proceeds to the step S109.

At this step S109, the braking force control unit 44 acquires the execution regenerative braking force (the corrected regenerative braking force/the revised regenerative braking force) by multiplying the correction factor A and the revision factor B that are retrieved and acquired with the maximum regenerative braking force set by the braking force setting unit 43 at the step S103, and starts and continues the driving control of the motor generators 4 and 5 so that this execution regenerative braking force will be generated, while repeating the similar processing by returning to the step S101.

In this way, when the driver makes the braking requiring operation by stepping on the brake pedal, the braking force control unit 44 can gradually suppress the regenerative braking force to be applied to the running motor vehicle according to the need, without complicating the regenerative braking control, by simply carrying out a simple processing of multiplying the maximum regenerative braking force set by the braking force setting unit 43 with the correction factor A (B=1) according to the deceleration level G of the motor vehicle, or the correction factor A and the revision factor B, and replacing the maximum regenerative braking force.

In particular, in the case of an extremely small driving speed Vs immediately before the stopping, the deceleration level G will also become small, so that the execution regenerative braking force to be set again in the braking force setting unit 43 can also be made small (by making the suppression large) in conjunction with that, and it is possible to prevent the motor vehicle from running at a speed according to the inertia as the large maximum regenerative braking force that had been set is suddenly released immediately before the stopping, while entrusting the braking operation of the driver without applying the regenerative braking force unnecessarily.

Figure 6:
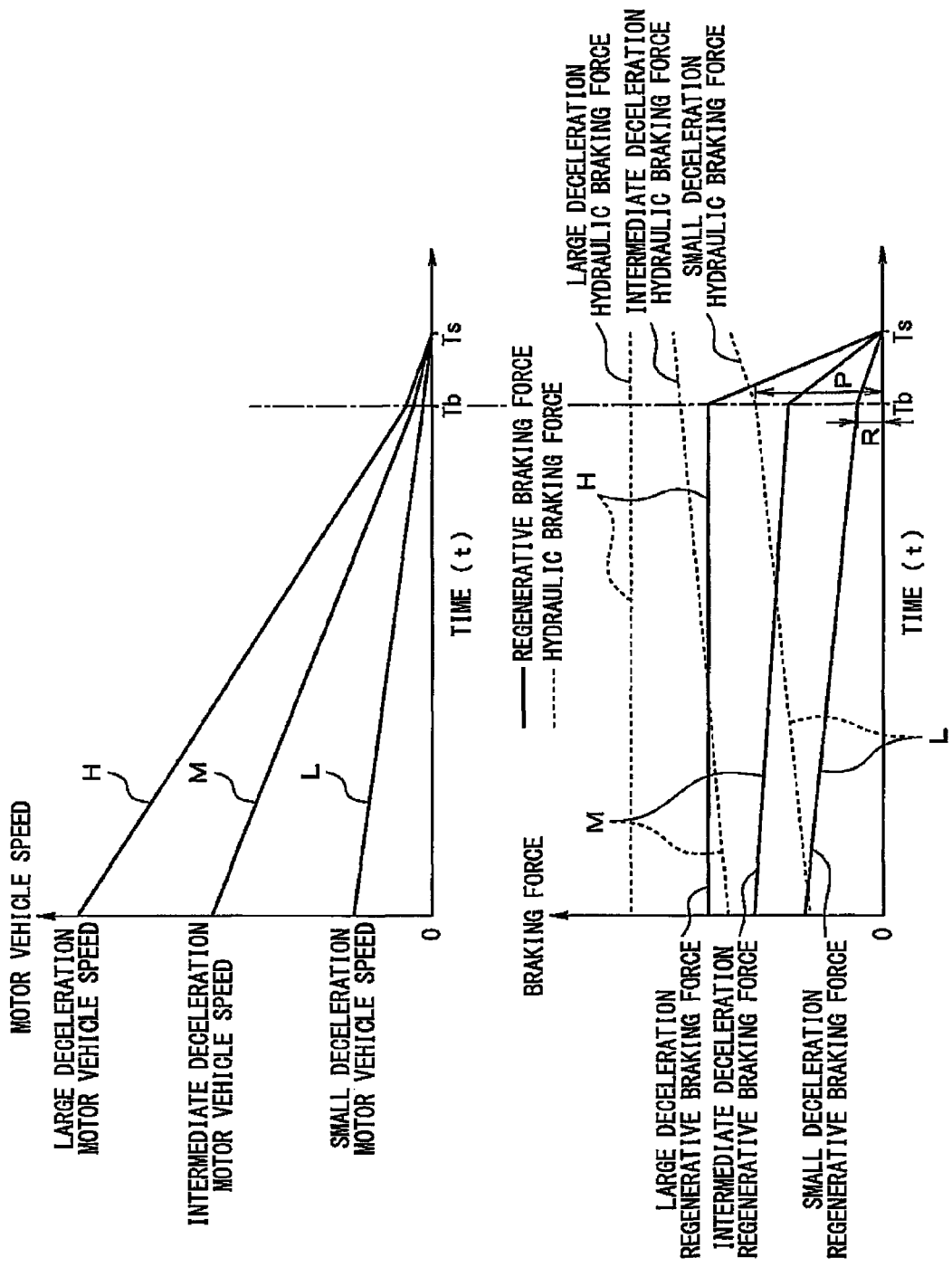
FIG. 6 is a graph for comparing its result of correction of a regenerative braking force.

This will be explained using FIG. 6 and FIG. 7, for example. FIG. 6 is showing a change of the driving speed on an upper side and a change of the braking force on a lower side in correspondence, with a relatively coincident course of time since the brake pedal is stepped on in order to stop until a time of stopping Ts by releasing the regenerative braking force at a time Tb immediately before the stopping, in situations of a high speed driving H, a middle speed driving M and a low speed driving L.

First, as shown in FIG. 6, in the motor vehicle H in the high speed driving, the brake pedal is stepped on strongly as there is a need for a large deceleration (a heavy braking). For this reason, the high speed motor vehicle H will be decelerated by applying the maximum regenerative braking force (indicated by a dotted chain line in the figure, and will be done so hereafter) along with the maximum hydraulic braking force (indicated by a dashed line in the figure, and will be done so hereafter) as much as possible, and the motor vehicle will be suddenly stopped by the maximum hydraulic braking force after that maximum regenerative braking force is released (dropped) at a time Tb immediately before the stopping in that state.

Also, in the motor vehicle M in the middle speed driving, the brake pedal is stepped on with an intermediate level of force as there is a need for an intermediate deceleration that does not become a heavy braking. For this reason, the middle speed motor vehicle M will start the deceleration control due to the application of the maximum regenerative braking force of an intermediate level along with the hydraulic braking force of an intermediate level. At this point, when the deceleration level G of the motor vehicle becomes below 0.5 G of the gravitational acceleration g1 in FIG. 3, the maximum regenerative braking force will be replaced with the execution regenerative braking force (the corrected regenerative braking force) which is multiplied by the correction factor A, and decreased by being gradually suppressed until a time Tb immediately before the stopping. In this way, the driver will not be able to feel the braking effect comparable to the stopping requirement according to the deceleration indicated by a solid line in the upper side graph, so that the driver will unconsciously step on the brake pedal gradually more strongly to meet the required deceleration. After that execution regenerative braking force is released at a time Tb immediately before the stopping, this driver can stop the motor vehicle in that state by the hydraulic braking force that is stepped on somewhat strongly.

Also, in the motor vehicle L in the low speed driving, the brake pedal is stepped on with a small force as there is a need for a small deceleration at a level of stopping quicker than the coasting. For this reason, the low speed motor vehicle L will start the deceleration control due to the application of the small maximum regenerative braking force along with the hydraulic braking force of a small level. At this point, when the driving speed Vs of the motor vehicle becomes below the motor vehicle speed v1 that is set in advance, that maximum regenerative braking force will be replaced with the execution regenerative braking force (the revised regenerative braking force) which is multiplied by the correction factor A and the revision factor B, and decreased by being gradually suppressed until a time Tb immediately before the stopping. In this way, the driver will not be able to feel the braking effect comparable to the stopping requirement according to the deceleration indicated by a solid line in the upper side graph, so that the driver will unconsciously step on the brake pedal gradually more strongly to meet the required deceleration. After that execution regenerative braking force is released at a time Tb immediately before the stopping, this driver can stop the motor vehicle in that state by the hydraulic braking force that is stepped on somewhat strongly.

To supplement a little bit further, in the actual driving, the speed dropping rate of the motor vehicle is not constant, and there can be a case of carrying out the braking control for reducing the brake in order to improve the riding comfort by trying to avoid the heavy braking, and on the contrary similarly there can be a case of carrying out the braking control for increasing the stepping force on the brake in order to avoid deteriorating the riding comfort by causing a need for the heavy braking as it failed to stop at a desired location when the speed is not dropped as much as expected. In such an adjustment of the deceleration speed of the motor vehicle, the level of suppression of the regenerative braking force is extremely small so that the driver will unconsciously carry out the braking operation to fill a gap that is arising, in order to maintain a stable deceleration state in accordance with his own imagination, and even in the case where the regenerative braking force is lost eventually or in the case where the small driving force in the acceleration direction due to the creep phenomenon to be described below is added, he can stop the motor vehicle with the driving feeling in accordance with his intention surely by the somewhat stronger hydraulic braking force, without deteriorating the riding comfort.

Figure 7:
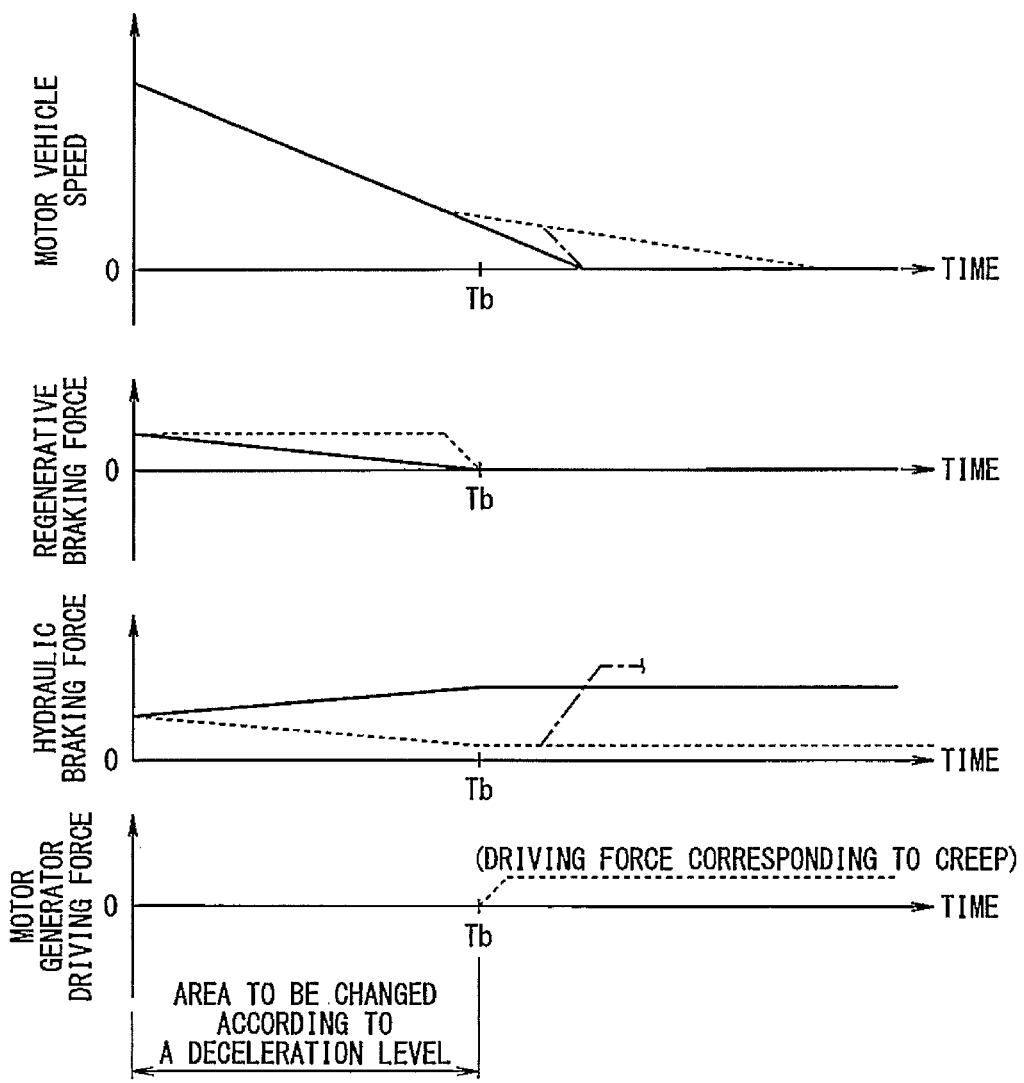
FIG. 7 is a graph for explaining its result due to a correction of a regenerative braking force.

At this point, even in the motor vehicle L in the low speed driving with the deceleration level close to the deceleration level g2 (0.2 G) shown in FIG. 3, the hydraulic braking force P can be made considerably larger than the regenerative braking force R in the braking force ratio to be applied to the running motor vehicle immediately before the stopping, and at this point, in the motor vehicle L in the low speed driving, the relative relationship of the motor vehicle speed Vs, the regenerative braking force and the hydraulic braking force before and after the stopping is as shown in FIG. 7. In a range from the deceleration level g1 (0.5 G) to the deceleration level g2 shown in FIG. 3, the maximum regenerative braking force is suppressed to the execution regenerative braking force by multiplying the correction factor A, so that as indicated by a solid line in FIG. 7, the execution regenerative braking force is gradually decreased while the hydraulic braking force is gradually increased, and even after the regenerative braking force is released at a time Tb immediately before the stopping, the motor vehicle can be decelerated such that the driving speed Vs becomes smoothly continuous and stopped only by the hydraulic braking force.

In contrast, as indicated by a dashed line in FIG. 7, in the case where the maximum regenerative braking force is maintained to be constant without suppressing it and this maximum regenerative braking force is released at a time Tb immediately before the stopping, the amount of stepping on the brake pedal is small and the hydraulic braking force is very small because the maximum regenerative braking force was applied before a time Tb immediately before the stopping. Nevertheless, when the maximum regenerative braking force is released at a time Tb immediately before the stopping, the rate of deceleration becomes extremely small and some time and distance will be required until stopping because it is in a state of applying the brake only with the small hydraulic braking force. At this point, if the maximum regenerative braking force is released and driving by the inertia is continued, there can be a case where the driver will carry out the stopping operation by stepping on the brake pedal in hurry as he senses as if the acceleration is started because the level of deceleration is reduced, and when that happens, as indicated by a dotted chain line in FIG. 7, the hydraulic braking force is increased abruptly and the motor vehicle will be stopped suddenly. Here, the lowermost graph in FIG. 7 indicates that, after releasing the regenerative braking force, in order to realize the driving that handles the motor vehicle similarly as the creep phenomenon of the engine 2, the motor generators 4 and 5 are operated to drive by the driving force corresponding to that creep phenomenon. For this reason, the motor generators 4 and 5 will generate the driving force in a direction of accelerating which is opposite of the regenerative braking force, so that the motor vehicle will become more difficult to stop in a state in which the hydraulic braking force is small.

Note that, in the graph of the braking force shown in a lower side of FIG. 6, a total force of the hydraulic braking force and the regenerative braking force will become constant in each of the high speed driving H, the middle speed driving M and the low speed driving L, in other words, when the regenerative braking force is gradually suppressed as in the middle speed driving M or the low speed driving L, the hydraulic braking force is gradually increased at a rate of that suppressed part. Also, at this point, even in the case where the hydraulic braking force does not increase as the driver does not increase the stepping force on the brake pedal in conjunction with the suppression of the regenerative braking force, it is not that the large maximum regenerative braking force is going to be suddenly released immediately before the stopping, but only that the largely suppressed execution regenerative braking force is going to be released, so that the lowering of the riding comfort and the driving feeling is prevented.

Figure 8:
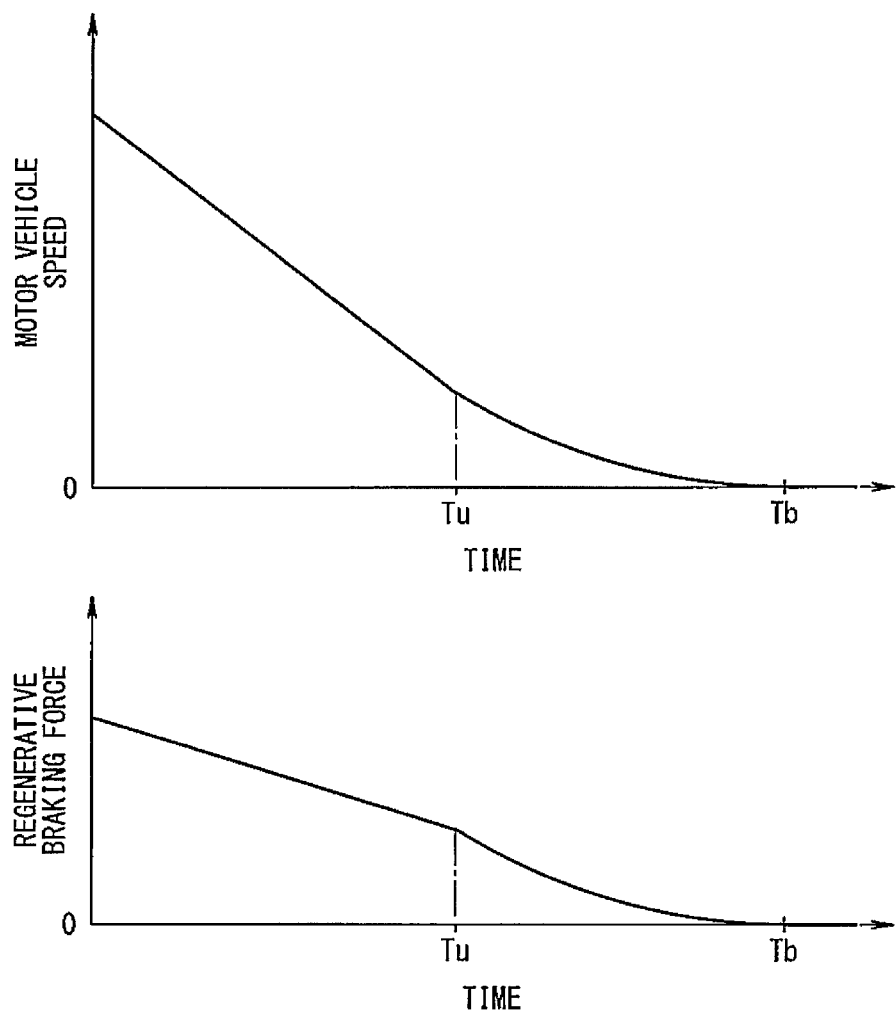
FIG. 8 is a graph for explaining its result due to a correction of a regenerative braking force that is different from FIG. 7.

Also, as the relationship between the motor vehicle speed Vs and the regenerative braking force shown in FIG. 7, one example in which the maximum regenerative braking force is corrected by multiplying a certain correction factor and suppressed to the execution regenerative braking force because the driving speed is decreasing at a constant deceleration level is shown. In practice, this deceleration level will be changed according to the situation, so that the correction factor will also be changed and the level of suppression will be varied, and therefore the execution regenerative braking force will also be changed. Also, in the flow chart shown in FIG. 5, when the deceleration level is smaller than the threshold of the step S106, the correction factor will be multiplied by the revision factor according to the decelerating motor vehicle speed Vs, so that as shown in FIG. 8, it becomes the operation feeling that is more dependent on the brake operation by the hydraulic braking force, as the deceleration level is reduced because the regenerative braking force is more largely suppressed from a timing Tu at which the deceleration level becomes below that threshold.

Consequently, the regenerative braking force according to the deceleration level G and the driving speed Vs of the motor vehicle can be generated effectively at the motor generators 4 and 5, while the regenerative energy can be collected efficiently without unnecessarily reducing it and charged into the battery 21, so that the motor vehicle can be stopped comfortably by avoiding the braking not intended by the driver and increasing the rate of the hydraulic braking force unconsciously so as to follow the braking required by that driver. Note that it is also possible to consider suppressing the regenerative braking force constantly by increasing the rate of the hydraulic braking force in order to give more importance to the riding comfort, but there are many problems such as the deterioration of the fuel efficiency due to the fact that the collection of the regenerative energy is reduced and a need to activate the engine 2 for the purpose of charging the battery 21 arises.

As such, in the present embodiment, when the motor vehicle decelerates, it is possible to decelerate the motor vehicle by the execution regenerative braking force which is suppressed according to the deceleration level G and the driving speed Vs, by preventing the maximum regenerative braking force that is set at a time of detecting the deceleration operation from being applied to the motor vehicle unchanged. Also, at the same time, it is possible to efficiently collect the regenerative energy that is generated by the motor generators 4 and 5 according to the appropriate regenerative braking force. Consequently, it is possible to make the motor generators 4 and 5 to generate the effective regenerative braking force, while it is also possible to collect the regenerative energy efficiently at the motor generators 4 and 5, and at the same time, it is possible to stop the motor vehicle by comfortably braking it and preventing the regenerative braking force from being applied excessively.

Figure 9:
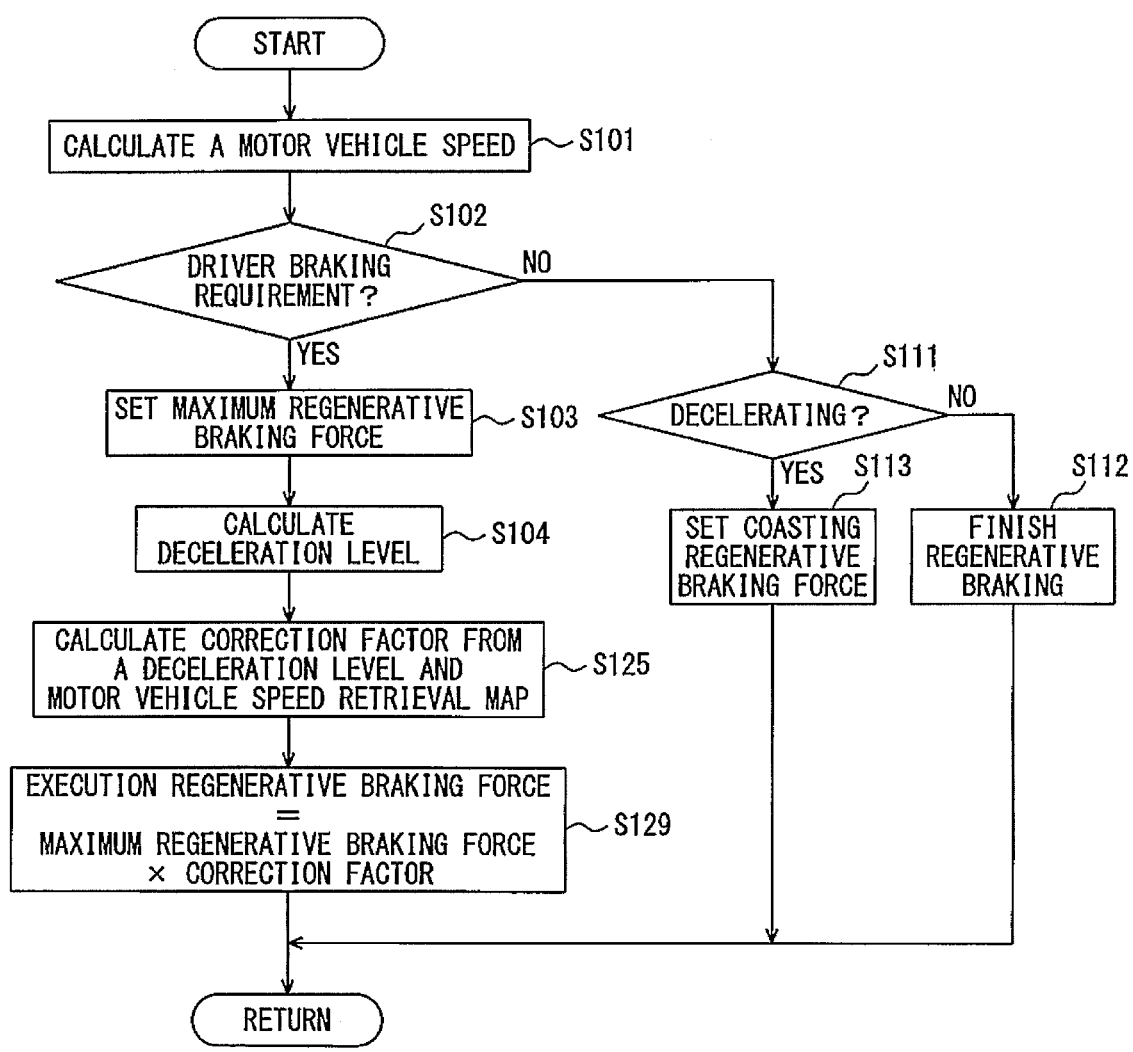
FIG. 9 is a flow chart for explaining another form of that embodiment.

As another form of the present embodiment, as shown in FIG. 9, for example, instead of the steps S105 to S109 of the flow chart shown in FIG. 5 of the above described embodiment, after acquiring the negative deceleration level G of the motor vehicle at the step S104, it may be processed by proceeding to the step S125.

More specifically, first, at the step S125, the braking force control unit 44 retrieves (calculates) and acquires the correction factor according to the motor vehicle speed Vs detected and acquired at the step S101 and the deceleration level G calculated and acquired at the step S104 from the similar retrieval map, and it proceeds to the step S129. At this step S129, the braking force control unit 44 acquires the execution regenerative braking force by multiplying the maximum regenerative braking force set at the step S103 by the braking force setting unit 43 with the correction factor based on the motor vehicle speed Vs and the deceleration level G that is retrieved and acquired, and starts and continues the driving control of the motor generators 4 and 5 such that this execution regenerative braking force will be generated, while repeating the similar processing by returning to the step S101.

In the case of this another embodiment, the maximum regenerative braking force can be corrected by the correction factor that always accounts for the motor vehicle speed Vs, so that the suppression of the regenerative braking force that is necessary according to the size of the deceleration level corresponding to high or low of the motor vehicle speed Vs can be made, and the execution regenerative braking force with better precision in accordance with the actual driving state can be set. For example, in the case of the low deceleration level, the suppression of regenerative braking force is started at a time of the high speed driving, and in the case of the intermediate deceleration level, the regenerative braking force is held constant until it becomes the low speed driving, and in the case of the high deceleration level, the suppression of the maximum regenerative braking force is avoided as in the above described embodiment, so that the braking can be applied to the running motor vehicle in cooperation with the hydraulic braking force according to the driving state.

The scope of the present invention is not limited to the exemplary embodiments shown in the figure and described, and contains all the embodiments that can achieve the effects equivalent to those aimed by the present invention. Moreover, the scope of the present invention is not limited to a combination of features of the invention as specified in each claim, and can be specified by any desired combination of specific features among all of the disclosed respective features.

INDUSTRIAL UTILIZABILITY

One embodiment of the present invention has been described so far, but the present invention is not limited to the above described embodiment, and it goes without saying that it can be implemented in various different forms within a range of its technical conception.

EXPLANATION OF REFERENCE NUMERALS 1 driving control device
2 engine
3 output shaft
4 first motor generator
5 second motor generator
6 driving wheel
7 driving shaft
8 first planetary gear mechanism
9 second planetary gear mechanism
13, 16 rotational shafts
19, 20 inverters
21 battery
22, 26 sun gears
23, 27 planetary gears
24, 28 planetary carriers
25, 29 ring gears
30 output gear
31 output transmission mechanism
32 driving control unit
33 acceleration opening level detection unit
34 motor vehicle speed detection unit
35 engine number of revolutions detection unit 36 battery state of charge detection unit
37 target driving force setting unit
38 target driving power setting unit
39 target charging and discharging power setting unit
40 target engine power calculation unit
41 engine control unit
41a idling maintaining judgment unit
42 motor generator control unit
43 braking force setting unit
44 braking force control unit
47 brake detection unit

The invention claimed is:

1. A regenerative control device for regenerative control of a motor generator in a motor vehicle, in which a regenerative braking force for decelerating the motor vehicle is generated at a time of collecting a regenerative energy generated by the motion of the motor vehicle, the regenerative control device comprising:
a driving state detection unit configured to detect a driving state of the motor vehicle;
a deceleration level acquisition unit configured to acquire a deceleration level of the motor vehicle from the detected driving state of the motor vehicle;
a braking force setting unit configured to set a level of the regenerative braking force for the motor generator at a time of detection of a driver input of braking requirement to the motor vehicle based on the detected driving state of the motor vehicle; and
a braking force adjustment unit configured to adjust and suppress the level of the regenerative braking force set by performing a correction in a direction of suppressing the level of the regenerative braking force in response to the deceleration level acquired by the deceleration acquisition unit after the detection of the driver input of braking requirement to the motor vehicle to provide a corrected regenerative braking force, and further wherein the level of the regenerative braking force is maintained as the corrected regenerative braking force when the deceleration level is not less than or equal to a predetermined threshold, but the level of the regenerative braking force is further suppressed so as to be suppressed further from the corrected regenerative braking force in response to the vehicle speed of the motor vehicle when the deceleration level is less than the predetermined threshold.

2. The regenerative control device as recited in claim 1, wherein the level of the regenerative braking force is further suppressed from the corrected regenerative braking force in response to the vehicle speed only when the vehicle speed is less than or equal to a predetermined vehicle speed level such that the level of the regenerative braking force is maintained as the corrected regenerative braking force when the vehicle speed is greater than the predetermined vehicle speed level.

3. A regenerative control method for regenerative control of a motor generator in a motor vehicle, in which a regenerative braking force for decelerating the motor vehicle is generated at a time of collecting a regenerative energy generated by the motion of the motor vehicle, the regenerative control method comprising:
acquiring a deceleration level of the motor vehicle;
setting a level of the regenerative braking force for the motor generator at a time of detection of a driver input of braking requirement to the motor vehicle; and
performing a correction in a direction of suppressing the level of the regenerative braking force in response to the deceleration level acquired by the deceleration acquisition unit after the detection of the driver input of braking requirement to the motor vehicle to provide a corrected regenerative braking force, and further wherein the level of the regenerative braking force is maintained as the corrected regenerative braking force when the deceleration level is not less than or equal to a predetermined threshold, but the level of the regenerative braking force is further suppressed so as to be suppressed further from the corrected regenerative braking force in response to the vehicle speed of the motor vehicle when the deceleration level is less than the predetermined threshold.

4. The regenerative control method as recited in claim 3, wherein the level of the regenerative braking force is further suppressed from the corrected regenerative braking force in response to the vehicle speed only when the vehicle speed is less than or equal to a predetermined vehicle speed level such that the level of the regenerative braking force is maintained as the corrected regenerative braking force when the vehicle speed is greater than the predetermined vehicle speed level.

* * * * *